United States Patent [19]
Merchant et al.

[11] 3,869,694
[45] Mar. 4, 1975

[54] ULTRASONIC CONTROL APPARATUS FOR AN OCULOMETER

[75] Inventors: John Merchant, Needham, Mass.; Donald J. Rotier, St. Paul, Minn.

[73] Assignee: Honeywell Inc., Minneapolis, Minn.

[22] Filed: Oct. 26, 1973

[21] Appl. No.: 409,868

[52] U.S. Cl. .................................. 340/16 R, 351/7
[51] Int. Cl. .................................. G01s 3/80
[58] Field of Search ......... 351/7, 16; 340/6 R, 16 R; 356/141, 152

[56] References Cited
UNITED STATES PATENTS
3,678,283  7/1972  Labaw ........................... 356/152 X
3,712,716  1/1973  Cornsweet et al. ..................... 351/7

*Primary Examiner*—Richard A. Farley
*Attorney, Agent, or Firm*—Charles J. Ungemach; Albin Medved; John S. Munday

[57] ABSTRACT

An improved oculometry system in which the observer is enabled to move within a larger eye space than heretofore, by the use of an ultrasonic measuring system for determining the position of the observer's eye, in a coordinate system in which the position of the oculometer is also known, the coordinates being used to compute the displacement of the observer's eye axially from the oculometer and transversely from its axis, and the focus and axial direction of the oculometer being adjusted accordingly.

6 Claims, 7 Drawing Figures

ULTRASONIC CONTROL APPARATUS FOR AN OCULOMETER

The invention herein described was made in the course of or under a contract or subcontract thereunder, with the Air Force.

BACKGROUND OF THE INVENTION

This invention relates to the field of optical instruments, and more particularly to apparatus for giving an output representative of the direction of the line of sight of an observer, whereby for example to identify the location of a fixation point which the observer is regarding. An instrument having this function is referred to herein as an oculometer, and oculometers are known in several forms.

FIELD OF THE INVENTION

A remote oculometer is one not materially connected to the observer using it. It includes a source of radiation, preferably invisible, to illuminate the eye of the observer. The radiation is projected by suitable projection optics into a region of space, which may be called the eye space, within which the observer's eye must be located for acceptable system operation. The eye space so illuminated is imaged, by suitable collection optics in the oculometer, on the screen of an electro-optical sensing device such for example as an image dissector or a vidicon. Associated electronic circuits analyze the signals from the sensing device to detect the presence and location of an eye in the eye space by the presence and relation of signal components characteristic of the pupil-iris boundary and of the corneal reflection of the radiation source. This process is referred to as searching for and acquiring the eye, and when it has been accomplished an output is supplied which indicates the direction of the line of sight of the eye, based on the spatial relation between the pupiliris boundary and the corneal reflection. That output is thereafter maintained regardless of linear or angular movement of the eye, as long as it remains within the eye space, and this process is known as tracking the eye.

The operation of the apparatus is based on the fact that when the optical axis of the eye is directed at the oculometer the normal location of the corneal reflection is substantially centered within the pupiliris boundary, and it remains there, even if the observer turns his head, as long as the eye remains in the eye space and its fixation point is not changed. This is due to the peculiar configuration of the eye, as will be discussed more fully in connection with FIGS. 2 and 3 below. If the eye looks at some other point, the corneal reflection appears displaced from the pupil center, and again maintains this displacement even if the observer turns his head. The oculometer gives a direction output which is determined by the amount and direction of the displacement of the corneal reflection from its normal location. The direction output is thus with respect to a zero of direction represented by a line from the eye to the oculometer, which defines "straight ahead" for that instrument.

The eye space is centered on the optical axis of the instrument: its dimensions transversely and longitudinally with respect to that axis are determined by limitations inherent in the projection and collection optics, which determine the field of view and depth of focus of the oculometer. In one successful oculometer of this sort the eye space has a volume of one cubic inch.

The foregoing condition obviously limits the use of oculometer to applications where the observer's eye can be restrained within the limited eye space of the instrument during use. A first attempt to increase the applicability of the oculometer involved providing accessory apparatus to make the eye space effectively a cubic foot, rather than a cubic inch, the accessory apparatus including means for altering the effective direction of the instrument's optical axis, and means for varying the distance of its focal plane. The first means comprised a mirror located near the oculometer sensor and adjusted by servo motors about horizontal and vertical axes when the eye location approached the limit of the one cubic inch eye space as sensed within the instrument by displacement of the image toward the edge of the sensing device, in effect moving the small eye space transversely within the larger one in accordance with the transverse component of the eye movement. The second means comprised apparatus and circuitry to detect any out-of-focus condition of the image at the sensor and energize a servomotor to position an adjustable focusing lens so as to restore the sharpness of the image, again in effect displacing the smaller eye space within the larger volume, this time axially, as the eye moved toward or away from the oculometer.

The above described system still limited the permissible rate of displacement of the user's head to that at which the servomotors could be driven. If the eye once moved out of the eye space the tracking signal ceased entirely, so that the eye space could not "catch up" with the eye again after the latter slowed down: a relatively lengthy search and acquisition procedure had to be interposed before tracking could again be performed.

SUMMARY OF THE INVENTION

It is a principal object of our invention to provide wide-angle apparatus independent of the electro-optical sensor for effectively maintaining the one inch eye space in a position where it encloses the observer's eye, while enabling the observer to move within an actual volume much greater in size.

It is a more specific object of our invention to provide means, including a computer and an ultrasonic measuring system, for determining the axial and transverse or angular displacements of the observer's eye relative to the oculometer and supplying signals to adjust the focus and direction of the oculometer accordingly.

Various other objects, advantages, and features of novelty which characterize our invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which we have illustrated and described a preferred embodiment of the invention.

Before proceeding further it may be helpful to give examples of the utility of oculometry systems. One such example is the possibility of keeping a camera pointed on a moving target by use of servomotors controlled, by changes in the direction of the line of sight of an operator, to remain on a subject his eye is watching. Another example is the possibility of studying the procedures of a person monitoring a complex bank of indicators, to learn the most successful search pattern for his operations by observing how often and for how long he regards different ones of the instruments.

DESCRIPTION OF THE PREFERRED EMBODIMENT

Figure 1:
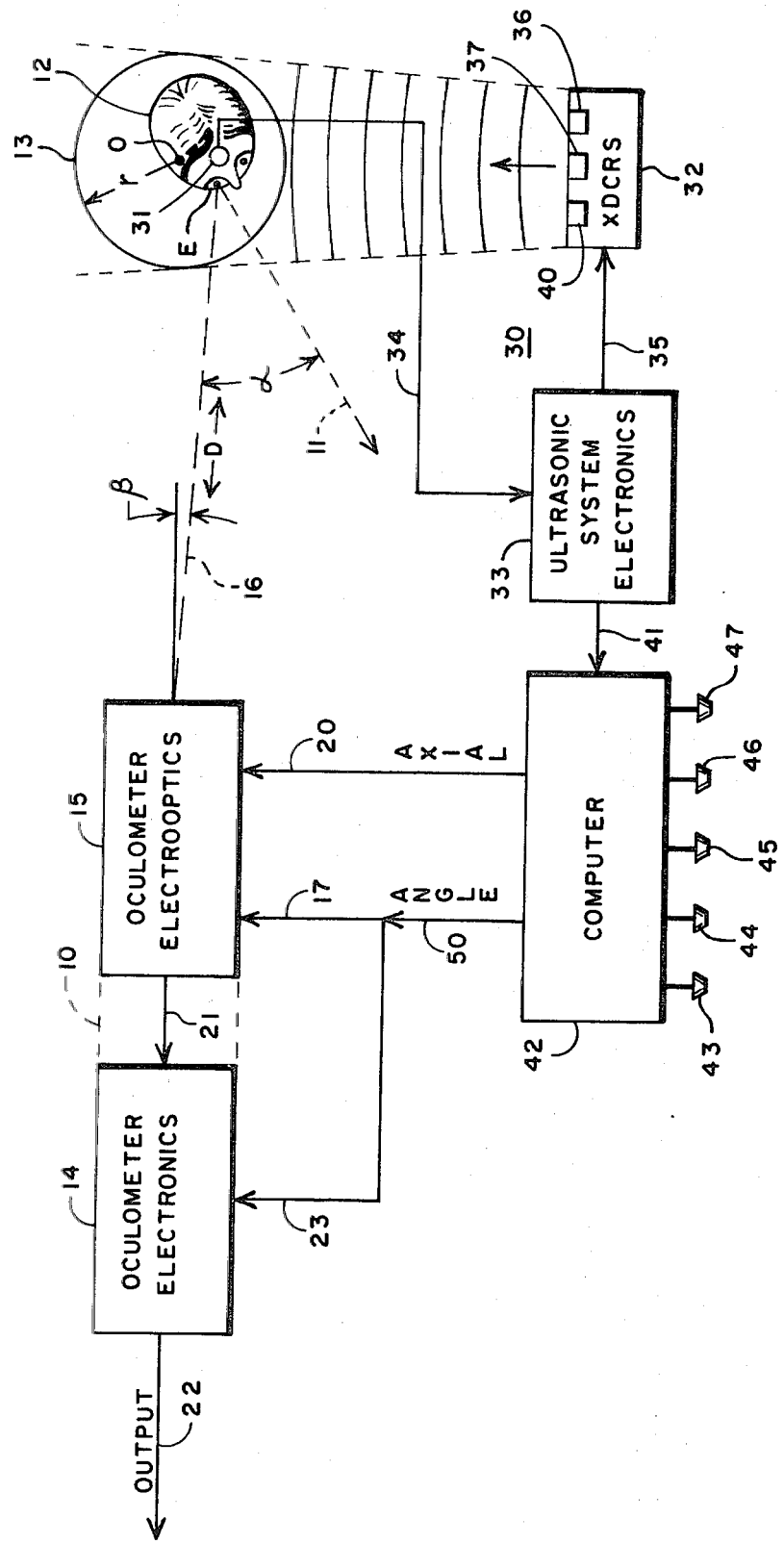
FIG. 1 is a somewhat schematic showing of an oculometer installation according to the invention.

Turning now to the drawing, FIG. 1 shows an oculometer 10 being used to determine the direction of the line of sight 11 of an observer 12 who is free to move within a volume of observation space represented in horizontal section by the circle 13 of radius r. Oculometer 10 includes an electronics portion 14 and an electro-optics portion 15, the latter having an optical axis 16 of which the direction may be changed by a servomotor actuated mirror in accordance with a signal supplied at 17, and a focus adjustment which may be changed by a servomotor actuated lens in accordance with a signal supplied at 20. The normal direction of axis 16 is that in which it passes through the center O of circle 13.

The electro-optics portion 15 includes means for projecting a narrow beam of preferably invisible radiation along axis 16 to impinge on the observer's eye, means for collecting radiation returned from the eye along axis 16, and a sensing device such for example as an image dissector or vidicon for supplying signals 21 representative of the image formed by the radiation on the sensing device. The electronics portion 14 receives the signals and derives from them an output representative of the deviation of the observer's line of sight 11 from axis 16. This output may be further modified by an input 23 representative of the deviation of axis 16 from its normal direction. The horizontal, or azimuth, components of these deviations are identified in FIG. 1 by the angles $\alpha$ and $\beta$ respectively.

Oculometer 10 is operative only if the eye E of the observer is within an image space of about one cubic inch centered on axis 16 and at a particular distance from the oculometer. In order for the cubic inch of eye space to contain the observer's eye as he moves within the observation volume 13, it must be displaced angularly by the direction servo-motors, and axially by the focus servomotor. Signals for controlling these servomotors are obtained as follows.

An ultrasonic position measuring system 30 is shown to comprise a single transducer 31 and a transducer array 32, connected to suitable system electronics 33 by cables 34 and 35 respectively. In the embodiment of the invention shown in FIG. 1 transducer 31 is a receiver and the array 32 of transducers comprises three transmitters 36, 37, and 40 having known mutual spacing in a triangular arrangement, but a system using a single transmitter and plural receivers could also be used. Transdurcer 31 is fixed to the observer's head in close proximity to the eye E. It may for example be mounted on the bridge of a pair of spectacles, or on a brow-band passing over the observer's forehead. For greater accuracy a pair of space receivers may be used instead of the single receiver 31, with corresponding changes in the rest of the system.

Although the eye of an observer appears to move considerably as his line of sight changes, the eye motion is essentially a rotation of the eyeball in its socket, about a center whose physiological location is known so that the vertical and transverse displacement of transducer 31 from the eye, as defined by the center of rotation thereof, is essentially constant and can be accurately determined. Therefore, if the coordinates of transducer 31 in a chosen system can be measured, the coordinates of the eye in the same system can be computed. As long as the eye remains within the one cubic inch of eye space the error due to parallax is not significant unless the observer tilts his head sideways, which does not ordinarily occur. It is even possible to correct for parallex due to head tilting, by means not forming a part of the present invention.

The coordinates of transducer 31 are determined in a coordinate system having its origin at one of the transducers of array 32. Under the control of electronics 33, transducer 36 for example emits a pulse of ultrasonic energy and the interval before it is received at 31 is measured: then transducers 37 and 40 emit pulses in sequence, and the transit times for these pulses are also measured. These transit times are transmitted at 41 from electronics 33 to a computer 42, where the distances from receiver 31 to the three transmitters are computed, the speed of sound being assumed or measured. The Cartesian coordinates of transducers 36, 37, and 40 and of oculometer 15 are known by measurement, and can be set into computer 42 by means indicated at 43, 44, 45, and 46, and the displacement of transducer 31 from the observer's eye may be set in by means indicated at 47. From these data it is a simple geometric problem to determine the distance D from the oculometer to the eye, and the angle $\beta$ between the normal angular direction of the oculometer axis and the direction in which it passes through E. Signal 20 to the oculometer electronics from the computer varies with the distance D, and signals 17 and 23 are from a computer output 50 which varies with the angular direction $\beta$.

OPERATION

Figure 2:
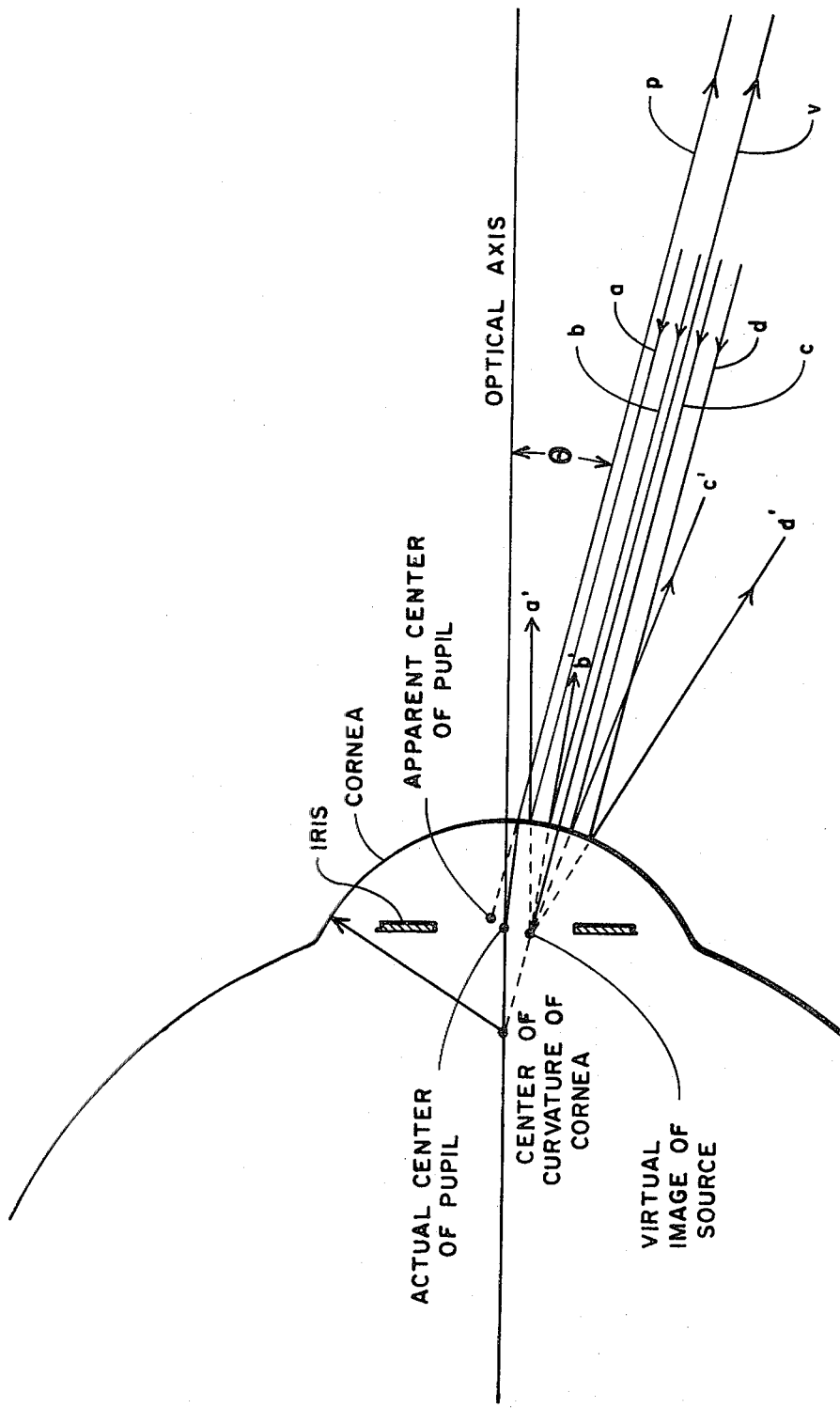
FIGS. 2 and 3A-3D are sketches showing the eye of an observer by whom the instrument is being used.

For the sake of completeness FIG. 2 is added to give a basis for understanding the principle underlying the oculometer. As shown schematically in that figure, the central portion of the cornea of the eye is a regular, slightly protuberant, high quality, outwardly convex surface, behind which is located the pupil, defined by the inner edge of the iris. The cornea is essentially transparent, but has a small reflection factor of about 3 percent. The pupil is approximately circular, and dilates or contracts with decrease or increase in the intensity of the visible light reaching the eye. The crystalline lens is located behind the pupil, and images external objects on the retina at the back of the eyeball: neither the lens nor the retina is shown in the figure to avoid unnecessary complexity. The eyeball includes retina, lens, iris, and cornea, and rotates about a substantially fixed center in the eye socket as the observer varies his line of sight. The optical axis of the eye extends through the center of curvature of the cornea and the centers of the lens and pupil. The line of sight extends from the fovea through the lens and cornea in the fixation point, and is not coincident with the optical axis. The angle between the optical axis and the line of sight is small and for any particular eye is constant. To change the direction of line of sight the observer may rotate his eye in its socket, or turn his head, or do both in any proportion.

It is well known that when a beam of parallel light source on a regular convex refracting surface, a virtual image of the source appears. If such a beam were directed along the optical axis in FIG. 2 from the right, the virtual image would lie on the axis, and hence would appear to coincide with the center of the pupil. In the figure the beam of light is shown as made up of parallel, oblique rays $a$, $b$, $c$, and $d$ projected from a suitable source, which are in part transmitted into the eyeball and in part reflected as $a'$, $b'$, $c'$, and $d'$, respectively. The virtual image, viewed from the direction of the source, is located at the point of intersection of the reflected rays if projected backwards, that is, at the end of the line $v$. The apparent center of the now apparently elliptical pupil is similarly located at the end of the line $p$: it is slightly displaced from the true position of the pupil's center because of refraction in the cornea, but this factor is small. For small values of the angle of obliquity $\theta$ this displacement may be neglected, and if necessary a correction for its value may be applied.

The position of the center of the pupil may be computed automatically, since the circumference of the pupil is evident. It has not been found that irregularity of the pupil, or changes in the location of its center with accommodation of the crystalline lens or dilation or contraction of the pupil, introduce any untoward complications.

Figure 3A:
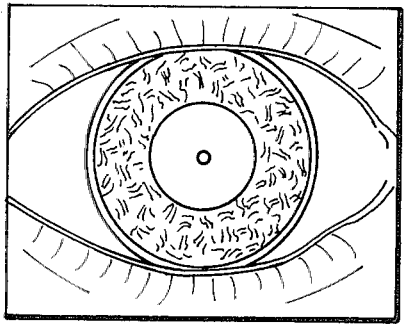

Consideration of FIG. 2 will make it apparent that the transverse displacement between lines $v$ and $p$ is a measure, by its direction and magnitude, of the departure of the optical axis of the eye from the direction of the beam of illuminating radiation. FIG. 3a shows the right eye of an observer looking directly at a small source of radiation: the virtual image of the source appears to be at the center of the pupil. FIG. 3b shows the right eye of an observer looking to the left of the source: the virtual image is displaced to the right of the center of the pupil, which is now an apparent ellipse having a horizontal minor axis. This is the case illustrated in FIG. 2. FIG. 3c shows the right eye of an observer looking at a point above the source: the virtual image is below the center of the pupil, which is not an apparent ellipse having a horizontal major axis.

Figure 3D:
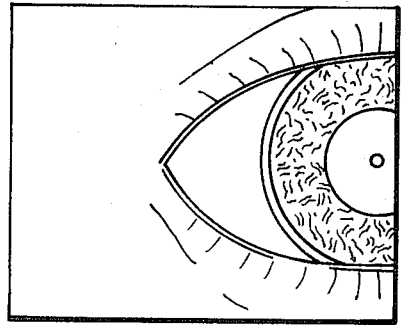
Figure 3B:
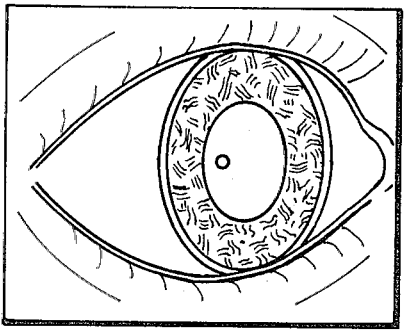
Figure 3C:
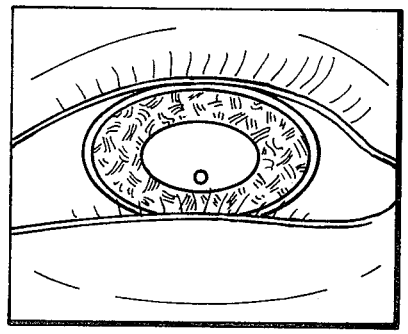

Consideration of FIGS. 2 and 3d will make it clear that small lateral displacement of the observer's eye, without any angular displacement, does not change the relation between lines $v$ and $p$ except to the extent that the displacement between the apparent and real pupil centers varies due to the different angle at which the line $p$ intersects the refractive cornea: as pointed out above, the effect has been found to be nominal. In FIG. 3d the observer is looking "straight ahead" as in FIG. 3a but his eye is slightly displaced laterally from the disposition of FIG. 3a: note that the virtual image is still at the center of the pupil.

The drawing does not attempt to depict the slight effect on the apparent position of the corneal reflection which results from the angular displacement between the line of sight and the optical axis. This is approximately five degrees in azimuth and 1° in elevation, and is corrected for in electronics 14.

The oculometer projects radiation beam $a$, $b$, $c$, $d$ in the near infrared wavelength band which is not annoying to the observer and does not appreciably affect the diameter of the pupil, and is yet readily perceptible by available electro-optical sensors. The oculometer receives energy along lines p and v and gives an output representative of the amount and direction of any displacement between them. It must be realized that the oculometer actually receives parallel rays of radiation from the locus of points defining the pupil boundary, and computes within itself the equivalent ray p from the center of the pupil.

For the special case where the observer is looking directly at the oculometer, see FIGS. 3a and 3d, the lines $p$ and $v$ coincide. If the observer is focusing on the oculometer, the transmitted components of rays $a$–$d$ are focused on the retina and "seen" clearly to the extent that they are in the visible band. If he is focusing on something nearer or further than the oculometer, the transmitted components of rays $a$–$d$ are not in focus at the retina and are seen in blurred outline if at all. Regardless of where he is focusing, the reflected components of rays $a$–$d$ determine the oculometer output 22.

Figure 4:
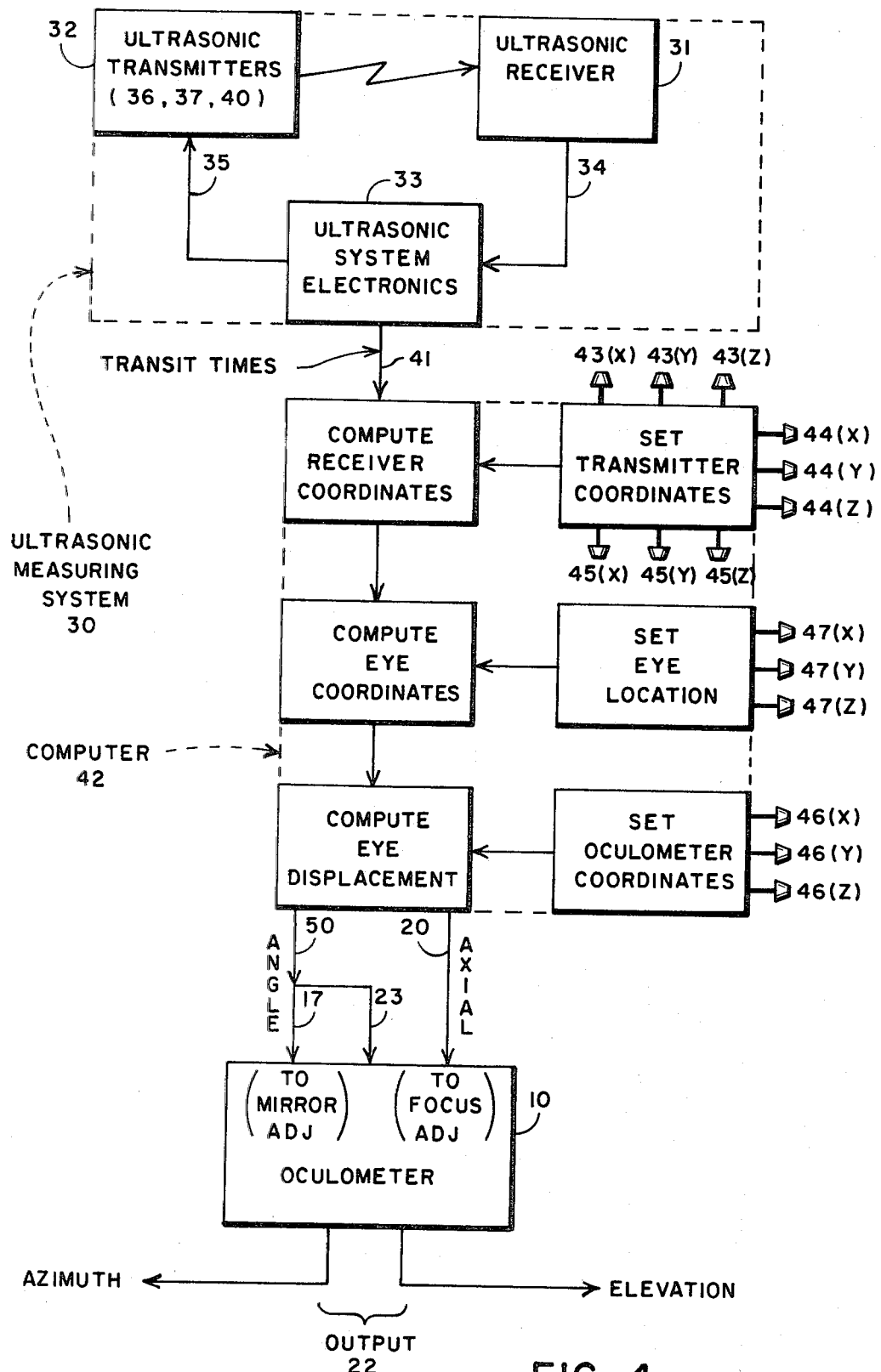
FIG. 4 is a simple functional or flow diagram of the system of FIG. 1.

The operation of the system of FIG. 1, based on principles explained in connection with FIGS. 2 and 3 will now be explained with reference to FIG. 4. The user of the system attaches transducer 31 to his head, enters the volume 13, positions the eye he intends to use on the line from the oculometer to 0, and looks directly at the oculometer. That instrument is in its normal condition, illuminates the eye, and receives an image at its sensor like FIG. 3a. At the same time transducer 36, 37, and 40 send ultrasonic pulses in a repeating sequence, and the transit times for these pulses pass through transducer 31 are measured, by unit 33, which comprises these transmit times at 41 to computer 42.

The coordinates of transducers 36, 37, and 40, in a three-dimensional Cartesian system where one of them may be at the origin, have been set into computer 42 at 43 (X,Y,Z), 44 (X,Y,Z), and 45 (X,Y,Z). The coordinates of the oculometer in the same Cartesian system have been set into the computer at 46 (X,Y,Z), and the displacement of transducer 31 from the center of eye E, for the location of the eye on the line through 0 with the observer focusing directly at the oculometer, are set into the computer at 47 (X,Y,Z). From these data the computer determines the axial distance of the eye from the oculometer, which it supplies at 20 for energizing the focus servomotor of the oculometer accordingly, and the angular deviation of the eye position from the initial axis direction of the oculometer, which it supplies at 50 for energizing the direction servomotors of the oculometer: initially this signal is substantially zero. Since the observer is at this time looking straight at the oculometer, its output 22 is zero.

The observer may now look away from the oculometer at an object of interest, and the oculometer thereupon gives an output representative of the angle between the oculometer axis and the line of sight. He may also move within volume 13: this results in a different set of transit times being supplied at 41 to computer 42, with different resulting outputs at 20 and 50. These in turn are fed to the direction and focus servomotors of the oculometer to in effect displace the cubic inch of effective eye space of the instrument so that it continues to enclose the observer's eye, thus maintaining a proper operating condition of the instrument. As the angle output from the computer changes, the oculometer angle output is also modified to compensate for the fact that it is measured from a changing zero of direction, so that the absolute direction of the observer's line of sight remains correct.

Numerous objects and advantages of our invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

We claim as our invention:

1. Apparatus for continuously giving an output representative of the direction of regard of an observer who is free to move and turn within an observation volume, including:
    means carried in part by the observer for giving a first output representative of the coordinates of the observer's eye in a predetermined coordinate system;
    optical means, including adjusting means for the focus thereof and for the angular direction of the optical axis thereof about a known center, for giving a second output in accordance with deviation of the observer's direction of regard from the direction of said optical axis; and
    means energized with said first output, and settable in accordance with the coordinates in said system of said known center, for adjusting one of said adjusting means in accordance with said first output.

2. Apparatus according to claim 1 in which the first named means comprises:
    ultrasonic apparatus, including transmitting means and receiving means, for giving a first signal representative of the location of one of said transmitting and receiving means with respect to the other;
    means mounting one of said transmitting and receiving means near an observer's eye for movement unitary therewith as the observer moves and turns within said observation volume;
    means settable in accordance with the coordinates of the other of said transmitting and receiving means for deriving from said first signal a second signal representative of the coordinates of said one means; and
    means settable in accordance with the location of said one means relative to the observer's eye for deriving from said second signal, as said first output, a third signal representative of the coordinates of the eye.

3. Apparatus according to claim 1 in which the last named means energized with said first output comprises means energized with said first output, and settable in accordance with the coordinates of said known center, for adjusting said optical means angularly about said center so that said axis passes through the observer's eye.

4. Apparatus according to claim 1 in which the last named means energized with said first output comprises means energized with said first output, and settable in accordance with the coordinates of said known center, for adjusting said optical means angularly about said center so that said axis passes through the observer's eye, and for giving a further output representative of said angular adjustment;
    together with means combining said second output and said further output to give an indication of the observer's direction of regard.

5. Apparatus according to claim 1 in which the last named means energized with said first output comprises means energized with said first output, and settable in accordance with the coordinates of said known center, for adjusting the focus of said optical means to the distance from said optical means to the observer's eye.

6. Apparatus according to claim 4 in which the last named means energized with said first output further comprises means energized with said first output, and settable in accordance with the coordinates of said known center, for adjusting the focus of said optical means to the distance from said optical means to the observer's eye.

* * * * *